United States Patent [19]

Umetsu et al.

[11] Patent Number: 4,978,828

[45] Date of Patent: Dec. 18, 1990

[54] DEVICE AND METHOD FOR CONFIRMING THAT A WIRE ELECTRODE FOR A WIRE CUTTING DISCHARGE MACHINE HAS PENETRATED A WIRE GUIDE SECTION ON A WIRE TAKE-OUT SIDE

[75] Inventors: Masahito Umetsu, Atsugi; Morikatsu Matsuda, Isehara, both of Japan

[73] Assignees: Amada Company, Limited; Amada Wasino Company, Limited, both of Japan

[21] Appl. No.: 369,524

[22] Filed: Jun. 21, 1989

[30] Foreign Application Priority Data

Jun. 21, 1988 [JP] Japan .................................. 63-151293

[51] Int. Cl.⁵ .............................................. B23H 7/10
[52] U.S. Cl. .................. 219/69.12; 219/69.17

[58] Field of Search .......................... 219/69.12, 69.17; 226/108

[56] References Cited

FOREIGN PATENT DOCUMENTS 238670  9/1987  European Pat. Off. .

Primary Examiner—Geoffrey S. Evans
Attorney, Agent, or Firm—Wigman & Cohen

[57] ABSTRACT

A wire cutting electric discharge machine that has wire supply rollers 17A and 17B feed the wire at a first speed and a wire feed out section that conveys the wire to a scrap box at a second speed that is greater than the first speed. Detection of the wire successfully reaching a wire guide section on the wire take out side is accomplished by detecting the speed of movement of a wire supply roller to see when it exceeds a preset fixed speed of movement.

4 Claims, 2 Drawing Sheets

DEVICE AND METHOD FOR CONFIRMING THAT A WIRE ELECTRODE FOR A WIRE CUTTING DISCHARGE MACHINE HAS PENETRATED A WIRE GUIDE SECTION ON A WIRE TAKE-OUT SIDE

BACKGROUND OF THE INVENTION

1. Field of the Invention

The present invention relates to a device and method for confirming that a wire electrode for a wire cutting discharge machine has penetrated a wire guide section on a wire take-out side.

2. Description of the Prior Art

In order to automatically operate a wire cutting discharge machine, a device which can confirm that a wire electrode delivered from the wire delivering side is certainly penetrated through a wire guide section provided on a wire take-out side. There are various method to penetrate the wire electrode through the wire guide section in the wire cutting discharge machine: e.g.: a method by which the wire electrode is inserted through a preset through-hole in the workpiece secured on a table and thereafter is penetrated through a wire guide section, a method by which the wire electrode is caused to penetrate the workpiece by forming its own hole in the workpiece and thereafter is caused to penetrate the wire guide section; and a method by which a wire electrode is caused to pass by the workpiece and then to penetrate the wire guide section.

In any of these methods, the wire cutting discharge machine runs automatically, and it is necessary to confirm that the wire electrode has actually penetrated the wire guide section on the wire take-out side. Accordingly, as conventional) methods of confirming that the wire electrode has penetrated the wire guide section on the wire take-out side, the following means have been devised.

Specifically, for example, in one such means an electrical contact is provided on each of a wire guide on the wire delivery side which feeds the wire electrode to the workpiece, and a wire guide on the wire take-out side which takes out the part of the wire which has been passed through the workpiece. A low voltage is applied between these contacts, which are then short circuited by the wire electrodes. Detection of the disappearance of the voltage difference confirms that the wire electrode has penetrated the wire guide section on the wire take-out side.

In another method, an actuator for a microswitch is provided in the passage for the wire electrode. The configuration is such that when the wire electrode penetrates the wire guide section on the wire take-out side, and the wire electrode is introduced into the wire take-out section so that tension is activated in the wire electrode, the microswitch is activated; when the time interval that the microswitch is activated continuously is greater than a set time interval, this status is detected, confirming that the wire electrode has penetrated the wire guide section on the wire take-out side.

In a method which detects when the wire electrode has penetrated the wire guide section on the wire take-out side, such as in the former example, in the configuration where an electrical contact is provided on both a wire guide on the wire delivery side and a wire guide on the wire take-out side to ensure that the contact of the wire electrode and the electrical contact has occurred, the electrical contact must be provided in the passage for the wire electrode. This creates the problem that the electrical contact can readily obstruct the passage of the wire electrode. In addition, the contact resistance between the wire electrode and the electrical contact is unstable so that the contact detection is unstable.

In addition, in the other configuration, using the microswitch, the actuator of the microswitch may be separated from the wire electrode by an accident. Further, when the actuator is always touching the wire electrode, it is very susceptible to vibrations in the wire electrode or the like. This produces the drawback of a high rate of damage to the actuator.

SUMMARY OF THE INVENTION

A first object of the present invention is to provide, with due consideration to the drawbacks of such conventional devices, a method and device by which it is possible to accurately confirm that a wire electrode for a wire cutting discharge machine has penetrated a workpiece.

A second object of the present invention is to provide a method and a device by which it is possible to confirm that a wire electrode for a wire cutting discharge machine has penetrated a workpiece, without obstructing the passage of the wire electrode through the wire guide section on the wire take-out side.

These objects of the present invention are achieved by the provision of a method for confirming that a wire electrode for a wire cutting discharge machine which is fed from the wire delivery side has penetrated a wire guide section on a wire take-out side, comprising steps of: delivering a wire electrode at a fixed speed discharge machine; introducing the wire electrode, which is passed through or passed by the workpiece, into the wire take-out section of the opposite side; and detecting changes of the speed of movement of the wire electrode from the delivery speed to a take-out speed when the wire electrode penetrate the wire guide section on the take-out side.

Also, these objects of the present invention are achieved by the provision of a device for confirming that a wire electrode for a wire cutting discharge machine has penetrated a wire guide section on a wire take-out side comprising: a speed detection means for detecting the delivery speed of the wire electrode in a wire delivery section which delivers a wire electrode in a wire cutting discharge machine; a speed setting means for presetting a fixed speed of movement larger than the wire delivery speed of a wire delivery section; a comparison means for comparing the value detected by the speed detection means with the set value of the speed setting means; and a decision means for deciding from the output of the comparison means whether or not the wire electrode has penetrated the wire guide section on a wire take-out side.

In the present invention, when the wire electrode is fed in the wire delivery section in the wire cutting discharge machine, the wire electrode is advanced a specified delivery speed, reaches the workpiece, and is inserted into a through-hole which has, for example, been formed in the workpiece. The wire electrode penetrates the wire guide section on the wire take-out side, and when it reaches the wire take-out section the wire electrode is introduced into the wire take-out section and is moved a the take-out speed out the wire take-out section. Specifically, the speed of movement of the wire electrode changes form the delivery speed of the wire delivery section to the take-out speed of the wire take-out section, so that by detecting this change of speed it is possible to confirm that the wire electrode has penetrated the wire guide section on the wire take-out side and has reached the wire take-out section.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
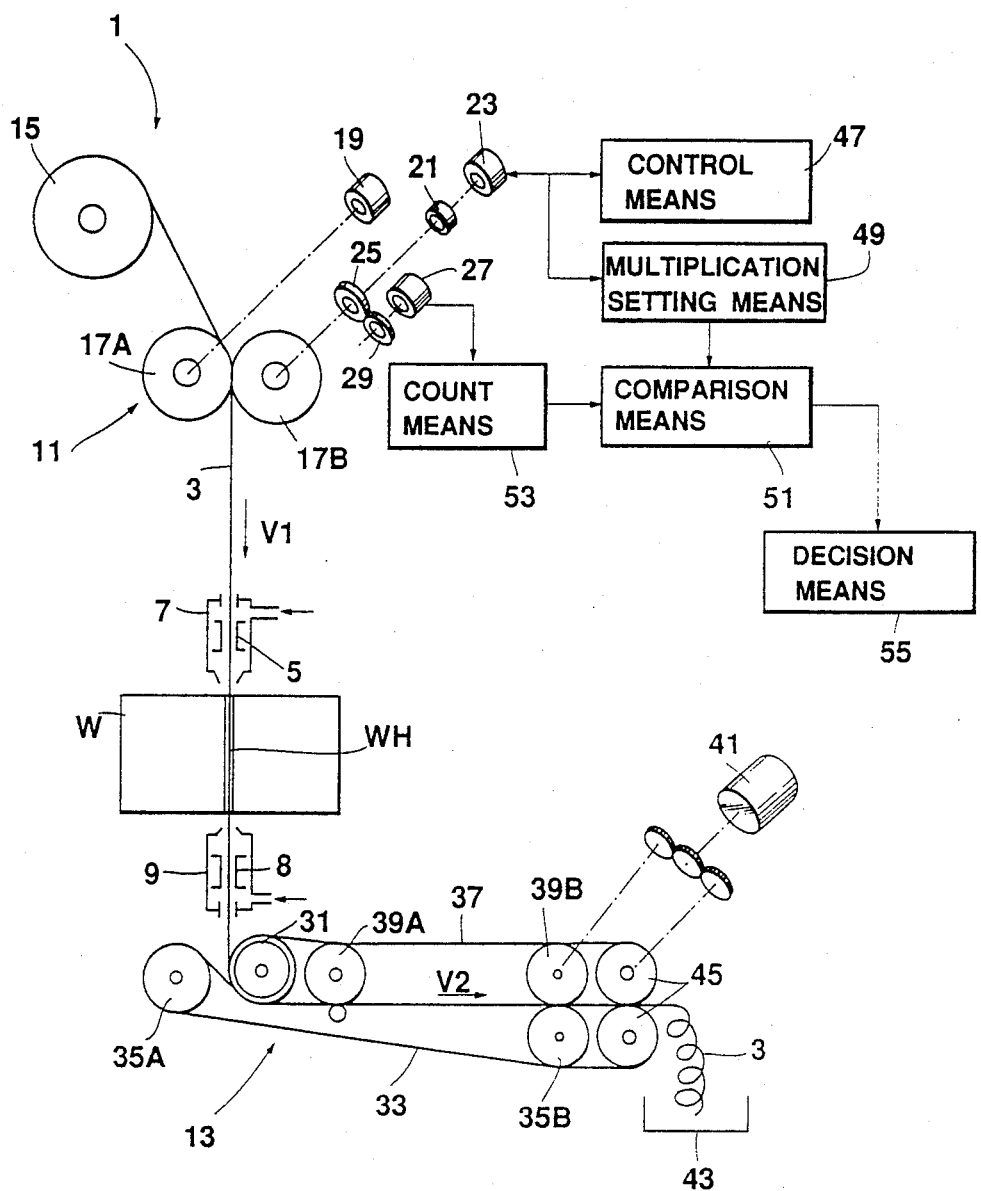
FIG. 1 is an explanatory drawing of a first embodiment of the present invention.

Now referring to FIG. 1, a wire cutting discharge machine 1 is basically provided with a table (omitted from the drawings) which is freely movable in both the X- and Y-axis directions. On the upper section of a workpiece W which is secured to the table by a securing tool, guide section 5 which guides a wire electrode 3 is provided. An upper wire guide nozzle device 7 is provided in a manner allowing free vertical adjustment The upper wire guide nozzle device 7 is provided with a wire guide section 5 which guides a wire electrode 3, and a nozzle orifice for spraying a process liquid on the discharge process section of the workpiece W. In addition, a lower wire guide nozzle device 9 having wire guide section 8, which is constructed in the same way as the upper wire guide nozzle device 7, is positioned on the lower position of the workpiece W.

A wire delivery section 11 which feeds the wire electrode 3 is provided in the upper position of the upper wire guide nozzle device 7. A wire feed-out section 13 is provided to feed out the wire electrode 3 after the wire electrode 3 is used in the discharge process at the discharge process section of the workpiece W.

A wire supply reel 15 is provided in the wire delivery section 11 for feeding out the wire electrode 3. The wire electrode 3 which is fed out from the wire supply reel 15 is squeezed between a pair of wire supply rollers 17A, 17B, and is delivered to the workpiece W by the rotation of the wire supply roller 17A, 17B.

A suitable brake device 19 is connected to the one wire supply roller 17A. The brake device 19 is used to provide specified braking when the wire electrode 3 is stretched by the wire take-out section 13 and has the function of applying tension to the wire electrode 3. A servomotor 23 (which may be a pulse motor) is connected through an electromagnetic clutch 21 to the other wire supply roller 17B. A gear 25 is provided on the same shaft as the wire supply roller 17B, and a gear 29 connected to a rotary encoder 27 (as one example of a speed detection means) engages the gear 25.

Accordingly, the wire supply roller 17B is rotatingly driven by the suitable rotation of the servomotor 23 to which the electromagnetic clutch 21 is connected. Therefore, the delivery or rewinding of the wire electrode 3 which is squeezed between the wire supply rollers 17A, 17B, can be performed.

In addition, by the detection of both the direction and amount of rotation of the wire supply roller 17B by the rotary encoder 27, the amount of the wire electrode 3 delivered (the length played out) can be known. Accordingly, for example, after the wire electrode 3 is cut, the position of the end section of the wire electrode 3 can be detected. In addition, by detecting the speed of rotation of the rotary encoder 27, the travel speed of the wire electrode 3 and the cutting of the wire electrode 3 can both be detected.

In the wire feed-out section 13, a guide roller forming with a V-shape groove 31 is provided to guide the wire electrode 3 in the transverse direction after the wire electrode 3 is passing through the lower wire guide nozzle device 9. A transport conveyor 33 is also provided to feed out the wire electrode 3. The transport conveyor 33 runs around a pair of pulleys 35A, 35B. In addition, in the wire feed-out section 13, an auxiliary conveyor 37 is provided so that the wire electrode 3 is interposed between the transport conveyor 33 and the auxiliary conveyor 37. The auxiliary conveyor 37 runs around a pair of pulleys 39A, 39B.

The conveyors 33, 37 are driven by a motor 41. A transport speed $V_2$, imparted to the conveyors 33, 37, is set at a speed which is larger than a delivery speed $V_1$ of the wire delivery section 11.

In addition, in the wire feed-out section 13, a pair of delivery rollers 45 are provided on the rear of the conveyors 33, 37 for inparting a tension to the wire electrode 3 between the roller 17a, 17b and the roller 45 by strongly squeezing the wire electrode 3, and for feeding the wire electrode 3 to a scrap box 43.

As a result of the above configuration, when the wire electrode 3 fed from the wire delivery section 11 passes through both the hole WH in the workpiece W and the wire guide nozzle device 9 and reaches the wire feed-out section 13, it is fed to the scrap box 43 by the feed-out conveyor 33 and the auxiliary conveyor 37.

At this time, the travel speed of the wire electrode 3 increases from the delivery speed $V_1$ of the wire delivery section 11 to the transport speed $V_2$ for the wire feed-out section 13. Accordingly, by the detection of the speed change in the wire electrode 3, it is possible to confirm that the wire electrode 3 has penetrated the workpiece W and reached the wire feed-out section 13.

A confirmation device is provided to confirm that the wire electrode 3 has reached the wire feed-out section 13. Specifically, a control means 47 such as, for example, a CNC control device, is provided to control the servomotor 23. A pulse signal output form the control means 47 to the servomotor 23 is input simultaneously to multiplication setting means 49. In the multiplication setting means 49, a fixed number (greater than one) is multiplied to a number of pulses output to the servomotor 23, and the result is output to a comparison means 51.

The comparison means 51 compares the value input from a count means 53, which counts the number of pulses from the rotary encoder 27, with the value (set value) input from the multiplication setting means 49. When the value input from the count means 53 is greater than the value input from the multiplication setting means 49, a signal is output to a decision means 55. The decision means 55 determines that the wire electrode 3 has reached the wire feed-out section 13 from the signal input from the comparison means 51, and outputs a confirmation signal to the control means 47.

Specifically, by means of this embodiment of the present invention, the servomotor (pulse motor) 23 is caused to rotate by the pulse signal output from the control means 47, and the wire electrode 3 is delivered at the delivery speed $V_1$. Until the wire electrode 3 reaches the wire feed-out section 13 the delivery speed $V_1$ of the wire electrode 3 is almost constant so that the number of pulses output from the rotary encoder 27 is equivalent to the delivery speed $V_1$. Accordingly, when a product of the number of pulses input to the pulse motor 23 and the fixed number calculated in the multiplication setting means 49 is compared in the comparison means 51 with a value from the count means 53, the value input from the multiplication setting means 49 is larger than the value input from the calculation means 53. Therefore, by the output from the comparison means 51 to the decision means 55, the decision means 55 determines that the wire electrode 3 has not yet reached the wire feed-out section 13. When the wire electrode 3 reaches the wire feed-out section 13 and the travel speed of the wire electrode 3 changes to the feed-out sped $V_2$, the wire supply rollers 17A, 17B are caused to rotate, following the travel speed of the wire electrode 3, and the output of the number of pulse from the rotary encoder 27 becomes an output equivalent to the feed-out speed $V_2$. Accordingly, the value input from the count means 53 is found to be larger than the value input from the multiplication setting means 49 in the comparison means 51. Therefore, the decision means 55 confirms that the wire electrode 3 has reached the wire feed-out section 13.

Figure 2:
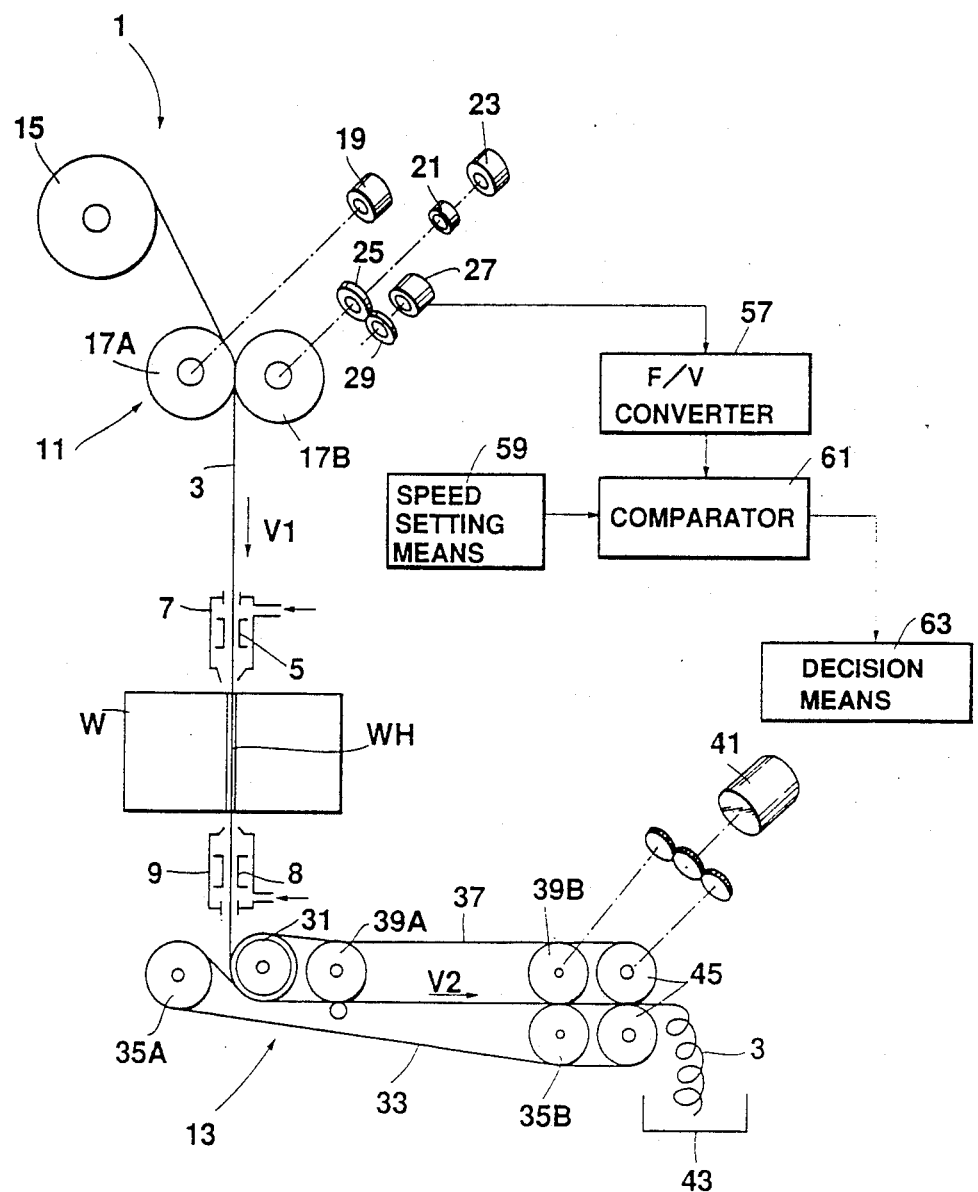
FIG. 2 is an explanatory drawing of a second embodiment of the present invention.

FIG. 2 indicates a second embodiment of the present invention. The output from the rotary encoder 27 is input to an F/V converter 57 and converted to a voltage. A voltage equivalent to the speed preset from a speed setting device 59 is compared with a voltage in the F/V converter 57 in a comparator 61 and the result of this comparison is output to a decision means 63.

In this configuration, when the wire electrode 3 reaches the wire feed-out section 13 and the travel speed of the wire electrode 3 changes from the delivery speed $V_1$ to the feed-out speed $V_2$, the value output from the F/V converter 57 becomes larger than the set value of the speed setting device 59. Therefore, the wire electrode 3 can be detected as having reached the wire feed-out section 13 from a comparison made in the comparator 61.

As can be understood from the explanation of the above embodiments, the change of the travel speed of the wire electrode from the delivery speed to the feed-out speed can be detected by means of the present invention, and because it can be confirmed that the wire electrode has reached the wire feed-out section, it can be detected and confirmed that the wire electrode has penetrated the workpiece.

Although the invention has been described in its preferred embodiments, it is to be understood that various changes and modifications may be made within the purview of the appended claims without departing from the true scope and spirit of the invention in its broader aspects.

What is claimed is:

1. A device for confirming that a wire electrode for a wire cutting discharge machine has penetrated a wire guide section on a wire take-out side comprising:
   a speed detection means for detecting the delivery speed of the wire electrode by detecting the speed of movement of a wire supply means for supplying the wire electrode;
   a speed setting means for presetting a fixed speed of movement larger than the wire delivery speed of the wire supply means;
   a comparison means for comparing the value detected by the speed detection means with the set value of the speed setting means; and
   a decision means for deciding from the output of the comparison means whether or not the wire electrode has penetrated the wire guide section on a wire take-out side.

2. A device according to claim 1, further comprising a step motor for driving said wire supply means, wherein said speed detection means outputs a pulse signal according to the speed of movement of the wire supply means; said speed setting means sets a value by multiplying a number of pulses to be output to the step motor by a fixed number; and said comparison means compares the number of pulses output from the speed detection means with the value set by the speed setting means.

3. A device according to claim 1, wherein said speed detection means outputs a voltage according to the speed of movement of the wire supply means; said speed setting means sets a predetermined voltage; and said comparison means compares the voltage output by the speed detection means with the predetermined voltage set by the speed setting means.

4. A method for confirming that a wire electrode for a wire cutting discharge machine has penetrated a wire guide section on a wire take-out side, comprising the steps of:
   detecting the delivery speed of the wire electrode by detecting the speed of movement of a wire supply means for supplying the wire electrode;
   setting a fixed speed of movement larger than the wire delivery speed of the wire supply means;
   comparing the delivery speed of the wire electrode with the fixed speed of movement; and
   deciding from the result of said comparing whether of not the wire electrode has penetrated the wire guide section on the wire take-out side.

* * * * *